United States Patent [19]

Dunn, Jr.

[11] 4,211,755

[45] Jul. 8, 1980

[54] PROCESS FOR BENEFICIATING TITANIFEROUS ORES

[76] Inventor: Wendell E. Dunn, Jr., 68 Arthur St., Sidney, Australia

[21] Appl. No.: 554,456

[22] Filed: Mar. 3, 1975

Related U.S. Application Data

[63] Continuation-in-part of Ser. No. 351,554, Apr. 16, 1973, abandoned, which is a continuation-in-part of Ser. No. 138,467, Apr. 29, 1971, abandoned, which is a continuation-in-part of Ser. No. 4,563, Jan. 21, 1970, abandoned.

[51] Int. Cl.² .............................. C01G 23/04
[52] U.S. Cl. .............................. 423/74; 106/300; 423/148; 423/149; 423/610
[58] Field of Search .......... 75/1 R, 1 T, 34, 111–113; 423/69, 82, 83, 138, 76, 79, 74, 492, 148, 149, 610; 106/300

[56] References Cited

U.S. PATENT DOCUMENTS

| | | | |
|---|---|---|---|
| 2,184,884 | 12/1939 | Muskat | 75/112 |
| 3,185,563 | 5/1965 | Jones | 75/1 |
| 3,446,590 | 5/1969 | Michal | 23/202 |

FOREIGN PATENT DOCUMENTS

| | | | |
|---|---|---|---|
| 206305 | 3/1955 | Australia | 75/1 |
| 533378 | 2/1941 | United Kingdom | 75/1 |
| 1243798 | 8/1971 | United Kingdom | 75/1 |
| 1304635 | 1/1975 | United Kingdom . | |

OTHER PUBLICATIONS

Perry, J. H. *Chemical Engineers' Handbook*, 4th ed., McGraw Hill, New York, N.Y., pp. 8–46 (1963).

*Primary Examiner*—L. Dewayne Rutledge
*Assistant Examiner*—Michael L. Lewis
*Attorney, Agent, or Firm*—Samuel V. Abramo

[57] ABSTRACT

A process for beneficiating titaniferous ores to a product having a lower percentage content of silicates, and other inerts comprising, at temperatures of 900°–1100° C., passing chlorine through a bed comprising (a) a first fraction of particulate titaniferous ore having about 90% of large particles, (b) a second fraction having about 90% small particles and (c) carbon in an amount equal to 10–30%, by weight, of the total titaniferous ore present, and removing freed silicates and inerts and by-product iron chloride thereby consuming (b) with the titanium dioxide values present in (b) being substituted for iron oxide values present in (a). The beneficiated ore is useful as an intermediate for preparing titanium dioxide pigments.

1 Claim, No Drawings

PROCESS FOR BENEFICIATING TITANIFEROUS ORES

CROSS REFERENCE TO OTHER APPLICATIONS AND DISCLOSURE DOCUMENTS

This application is a continuation-in-part of my co-pending application, Ser. No. 351,554, filed Apr. 16, 1973, now abandoned, which in turn is a continuation-in-part of application Ser. No. 138,467, filed Apr. 29, 1971, now abandoned, which in turn is a continuation-in-part of application Ser. No. 4,563, filed Jan. 21, 1970, now abandoned. The invention has been described in Disclosure Document No. 002115, filed May 18, 1970.

FIELD OF THE INVENTION

This invention relates to a high temperature chlorination process for beneficiating titaniferous ores. Certain titaniferous ores are inconvenient and uneconomical to beneficiate because of their large silicate content at the grain boundary, as well as in the grain. The only object of prior known methods of beneficiation of titaniferous ores has been the removal of the iron component of the ore, as for instance, by leaching out the iron with acid solutions without disturbing the titanium dioxide. The ore particle thus, in essence, passes through the process without modification of its silicate and titanium dioxide portions so that the silicate ratio to the contained titanium dioxide content is not reduced, nor is the titanium dioxide ratio to silicate increased to enhance its value as a starting material for further chlorination to make pigments.

SUMMARY OF THE INVENTION

This invention pertains to a new process for beneficiating titaniferous ores containing large amounts of silicates involving chlorinating under reducing and fluidizing conditions a mixture containing a first titaniferous ore fraction having a high iron content and a second titaniferous ore fraction having a higher silicate content. The invention provides a method for recovering the titanium values from the second fraction to substitute for the iron values in the first fraction to produce larger average particle and a more dense beneficiate particle, of lower silicate content.

More particularly, this invention is directed to a process for beneficiating titaniferous ores into a substantially pure titanium dioxide product comprising:

(a) subjecting, in a gas-solids reactor with chlorine under fluidizing conditions and at a temperature of 900°–1100° C., a reactor bed mixture of 10–30%, by weight, of carbon and the balance particulate titaniferous ore wherein said particulate titaniferous ore is a mixture comprising (i) a larger particle size fraction having up to 90%, by weight, of titaniferous ore particles having a particle size of −60 to +120 mesh and (ii) a smaller particle size fraction having up to 90%, by weight, of titaniferous ore particles having a particle size of −120 to +200 mesh whereby the smaller particle size fraction is consumed within the reactor bed to form vaporized iron chloride and freeing gangue associated therewith and volatilizing titanium values therein to replace iron values in said larger particle size titaniferous ore forming thereby vaporized iron chloride, whereby the amount of titanium values in said smaller sized fraction are sufficient to replace the iron values in said larger sized fraction; and (b) withdrawing freed gangue and vaporized iron chloride.

This invention is also directed to the process for beneficiating by a combination of chemical and mechanical processing high silicate containing titaniferous ores where the fractions are of distinctly different sizes and contain distinctly higher silicate concentrations as an exterior shell surrounding the ilmenite particle such as occur in South African indurated beach sands. The high silicate fraction is partially beneficiated and reduced in size freeing the titanium values from the exterior silicate and incorporating the small titanium values in the larger ore lattices.

This invention is directed to a continuous process.

This invention is useful for producing an intermediate used to prepare titanium dioxide pigments or titanium metal. The product is further useful as a component of a welding rod.

Without being bound by theory, it would appear that this process provides an environment in the reaction media wherein the titanium values of the small sized particle ore fraction replace the iron values of the large sized particle ore fraction. Further, the small sized ore fraction due to its greater reactivity is totally consumed in the process with the titanium values being converted into titanium tetrachloride which then reacts with iron oxide in the large size ore particles replacing the iron value with titanium dioxide, the iron values being converted into volatile iron chlorides. The silicates which exist in the small sized particles along grain boundaries and as inclusions are freed and blown away from the product mass by the action of the reactant and by-product gases.

It is believed that the reactions occurring during the process are:

$$\tfrac{1}{2} C + FeO \cdot TiO_2 + Cl_2 = FeCl_2 + TiO_2 + \tfrac{1}{2} CO_2$$
$$TiO_2 + 2Cl_2 + XC = TiCl_4 + \text{a mixture of CO and } CO_2$$

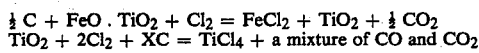

) Small Particles $$TiCl_4 + 2FeO \cdot TiO_2 = 2FeCl_2 + 3\,TiO_2$$
$$\tfrac{3}{2} TiCl_4 + FeO_{1.5} \cdot TiO_2 = FeCl_3 + \tfrac{3}{2} TiO_2 \cdot TiO_2$$

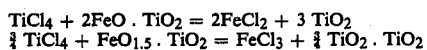

) metal interchange reaction within the large ore particles.

The ratio of the large sized particle ore fraction to the small sized particle ore fraction is determined by the amount of iron oxide and its reduction state in the large sized particle ore fraction and the amount of titanium dioxide in the small sized particle ore fraction. As will be more fully defined hereinafter, the ore mixture to be beneficiated preferably contains in the small sized particle ore fraction sufficient titanium dioxide to completely replace the iron content in the large sized particle ore fraction. It is believed that the iron content is converted to a mixture of volatile chlorides. The silicate component of the small sized particle fraction is released during the chlorination step and is removed from the reaction as a finely divided ash by the elutriation action of the fluidized bed gases. The result is a beneficiated ore having a lower percentage silicate than was heretofore possible.

There must be sufficient iron available for replacement in the large sized particles to absorb all the TiCl$_4$ generated by the recycled small sized particles. An excess of small sized particles will lead to a recirculating load which must be avoided. This sets a limit of how much small sized material may be accepted for incorporation into the large sized particles.

The conditions used in the process are similar to those described in my application Ser. No. 4,563, filed Jan. 21, 1970, except that the desired ore mixture is used.

The process can be conducted in a brick bed reactor with a perforated refractory plate serving as a support for a fluidized bed of ore. The reactor is equipped with an inlet for ore and carbon above the bed, a gas inlet system with a gas distribution system leading to a perforated plate in its bottom, an outlet pipe for withdrawing by-product gases, constructed of water cooled metal, ceramic or other material resistant to corrosion of chlorides at 1100° C., and means for withdrawing the bed. The reaction is conducted using a fluidized bed depth of 0.5 to 2 feet or higher.

The reactant is chlorine under reducing conditions. The requisite reducing conditions can be achieved by mixing about 10–30%, by weight, of carbon or carbonaceous material with the ore. In general, the carbon can be petroleum coke, bituminous coke and the like. Continuously, chlorine passes upward through the bed at a bed temperature of 900°–1100° C. at a rate where fluidization of the bed occurs and the chlorine is totally consumed within the bed while iron chlorides and other metal chlorides are continuously withdrawn as gaseous vapor. The bed should be deep enough to avoid TiCl$_4$ breakthroughs where TiCl$_4$ escapes. The iron oxide concentration in the product is about 20 to 10%, by weight.

The improvement comprises forming a titaniferous ore bed comprising a mixture of titaniferous ore particles the first fraction having about 90%, by weight, of small sized particles and a second fraction having about 90%, by weight, of large sized particles, wherein the iron oxide in the second ore fraction and the titanium oxide in the first ore fraction correspond stoichiometrically according to the foregoing reactions whereby the titanium values of the first ore fraction replace the iron values of the second fraction.

Where two ores can be blended, one of low and one of high silicate content, one can make a beneficiate of lowered silicate content without incorporating any of the silica from the high silicate ore. The high silicate fraction can be made the smaller size fraction and performs its role as above, with the particles chlorinated to extinction and their titanium values incorporated in the large fraction which become the beneficiated product.

The process for beneficiating titaniferous ores described herein produces a beneficiate having moderate porosity, improved hardness and a bulk density of 1.8 to 2.4 g/cm, this product has been more fully described in my application for letters patent Ser. No. 138,460, filed July 12, 1971. These properties make this material a preferred intermediate for the production of titanium tetrachloride.

The titaniferous ore can be any of the naturally occurring ores such as ilmenite, e.g., Cable ilmenite (Western Australian sands) and the like. Since the iron oxide is replaced with titanium dioxide, ores having up to about 6.0 percent, by weight, of silicates and other difficultly chlorinated oxides can be used. The silicate concentration in the large particles remains essentially unchanged whereas the titanium dioxide concentration is increased. Therefore, the ratio of the amount of silicates and other inert impurities to titanium dioxide in the final product is lower than that of the ore.

By-product metal chlorides consist predominantly of ferrous chloride and lesser amounts of ferric chloride, manganese chloride, magnesium chloride and chlorides of other metals. The by-products stream also contains carbon dioxide and small amounts of titanium tetrachloride and carbon monoxide.

The chlorine used can be commercially available chlorine. Recycle chlorine can also be used. The rate of flow of chlorine should be adjusted to permit fluidization of the bed and yet minimize titanium tetrachloride blowover and breakthrough. In general the rate of flow of chlorine can be 0.19 to 2.0 feet/second.

The process is a recycle process where the partially beneficiated ore and fresh feed are continuously added to the fluidized reactor operating at 950°–1100° C. and chlorine is passed through the ore while partially beneficiated ore and coke are withdrawn and cooled. The cooled ore is passed through a magnetic separator to separate titanium dioxide product having 0 to 1.0%, by weight, iron oxide. The beneficiate having more that 1.0%, by weight, of iron oxide is recycled to the reactor with fresh ore addition. Also all of the fines, that is, particles smaller than the desired beneficiate product, are recycled to the reactor. This process is described more fully in my patent application, Ser. No. 4,563, filed Jan. 21, 1970.

The process of this invention can be used to beneficiate less desirable ores containing large amounts of calcium and manganese as well as silicates and other difficulty chlorinated impurites, for example New Zealand ilmenites.

In using these ores, the high silicate containing ore is ground to a particle size distribution of a fine size, as for instance, about −180 British Standard Mesh. The ground ore is mixed with other ilmenites of less silicates and a higher grade having a particle size distribution in the range of 75%, by weight, −60 to +100 mesh. The amount of the titanium values in the finely divided ore should correspond stoichiometrically to the total iron values in the large ore particles.

The process of this invention may be conducted with two ilmenites 60–95%, by weight, of the particles of the first ore fraction having large particles and a second ore fraction having small particles.

The reaction can be conducted at temperatures of 900°–1100° C. and 950°–1090° C. being most preferred.

The ore mixture is prepared by mixing the required amount of the first and second ore fractions. For example, one hundred pounds of ilmenite (Murphyores Queensland, Australia beach sand) having a composition as follows:

| | |
|---|---|
| TiO$_2$ | 54.1% by weight |
| FeO | 21.0% by weight |
| Fe$_2$O$_3$ | 21.0% by weight |
| Al$_2$O$_3$ (as aluminates) | 0.43% by weight |
| SiO$_2$ (as silicates) | 0.4% by weight |
| other oxides | remainder | and a particle distribution as follows:

|  |  |  |  |
|---|---|---|---|
|  | +60 | mesh (B.S.) | 3.0% by weight |
| −60 | +85 | mesh (B.S.) | 17.7% by weight |
| −85 | +100 | mesh (B.S.) | 49.7% by weight |
| −100 | +120 | mesh (B.S.) | 21.4% by weight |
| −120 |  | mesh (B.S.) | 8.3% by weight | be mixed with 63 pounds of ilmenite obtained from Tauranga Bay, Cape Foulwind, New Zealand ore having the following composition, as confirmed by reference to New Zealand Journal of Science Vol. 10, No. 2, June 1967, p. 452:

| | |
|---|---|
| $TiO_2$ | 46.5% by weight |
| FeO | 37.6% by weight |
| $Fe_2O_3$ | 3.2% by weight |
| $SiO_2$ (as silicates) | 4.1% by weight |
| $Al_2O_3$ (as aluminates) | 2.8% by weight |
| CaO | 1.4% by weight |
| MnO | 1.7% by weight |
| MgO | 1.2% by weight |
| other metal oxides | remainder | with a particle size distribution of:

|  |  |  |  |
|---|---|---|---|
|  | +72 | mesh (B.S.) | 0.31% by weight |
| −72 | +100 | mesh (B.S.) | 18.92% by weight |
| −100 | +150 | mesh (B.S.) | 56.21% by weight |
| −150 | +200 | mesh (B.S.) | 23.68% by weight |
| −200 |  |  | 0.68% by weight |

EXAMPLE I

Blending New Zealand ilmenite with Murphyores in a ratio of 63 lbs. NZ/100 lbs. Murphyores with properties as described above, a feed of 152 scfm $Cl_2$ and air, oxygen or $N_2$ to maintain bed temperature at 1050° C. and give a total flow of 180 scfm to a 5—5' diameter, 2' static depth bed containing 20%, by weight, Great Lakes petroleum coke. The feed and recycle streams were preheated to 600° C. to dry and partially oxidize the fresh feed. The fresh feed rate was 69 lbs./min.

The recycle stream consisted of magnetic particles separated at 4.0 amps. on an induced roll magnetic separator. The coke was sieved at 44 mesh and returned and the −120 mesh non-magnetics were also returned to the beneficiator after tabling and drying. The light silica and calcium chloride are removed in this step.

The non-magnetic stream of +120 mesh material is the product, 95% $TiO_2$, 1% $Fe_2O_3$ balance aluminum silicates and traces of vanadium, chromium and niobium oxides. The bulk density is 2.1 g/cc. Dust losses are of the order of 10% of the $TiO_2$ values.

The process of this invention employs solid carbon in its various forms, e.g., petroleum coke, coal, etc. Thus, to the ore mixture was added 30%, by weight, of minus 8 mesh powdered petroleum coke. The mixture was charged to a reactor described above, to form a fluidized bed about two feet static bed depth and then heated to 1050° C. Chlorine gas was passed continuously through the bed at a rate where fluidization of the ore-coke mixture occurred and the process conducted as described above.

As stated above, the silicate and aluminate exist in the ore particles as finely divided inclusions. Once this layer is freed from surrounding titanium dioxide and iron oxide, it is easily swept from the reaction bed by the upward action of the gaseous reactants or by-products or by passing an inert gas through the reaction bed to entrain the silicate. Additionally, the lighter particles removed from the bed can be separated by wet tabling to remove the coke together with leaching to remove the calcium chloride.

Beneficiation of the New Zealand ore by the prior art processes yields a product having no more than about 85%, by weight, titanium dioxide. By the use of my process, the product obtained contains about 95%, by weight, $TiO_2$ and 1.0% iron oxide.

Another example is in the treatment of a titaniferous ore where the particles of the ore are bound together by a silica matrix. For instance, the ore found in South Africa at Boathaville, Orange Free State, has particles of ilmenite bound together by quartz analyzed as follows:

| | |
|---|---|
| $TiO_2$ | 49.1% |
| $Fe_2O_3$ | 44.85% |
| MnO | 1.25% |
| Silicates (other) | 6.05% |

This ore when crushed shows that 70% of the silica content is found in the particle size through 44 mesh and above 85 mesh, 351 microns and 175 microns, respectively. Treatment of such an ore has been difficult until this invention which applies the hereinabove described chlorination process with the mechanical processing steps.

Silica shells frequently partially surround and are bound to ilmenite particles. The process of beneficiating the heating and cooling disrupt this bond making separation very easy with light crushing, or even tumbling.

Partial beneficiation leaves no iron in the outer edge adjacent to the quartz and needs to be only slight to completely destroy the silica-ilmenite boundary and facilitate mechanical separation. The great density and magnetic differences make gangue separation easy.

The invention can be viewed as involving after chlorination a magnetic separation performed on an overflow stream of the bed after it has been screened over and under about 85 mesh. The non-magnetic particles over about 85 mesh are air tabled and the lighter particles which are unreacted coke are returned to the fluidized bed, while heavier silica remaining is disposed of as waste. The magnetic particles over about 85 mesh are crushed to below 85 mesh, run through a magnetic separator and the non-magnetic portion is air tabled to remove additional silica and the residuals are returned to the reactor as is the magnetic portion. The portion of bed particles removed from the reactor which are less than 85 mesh are also magnetically separated. The magnetic portion is returned to the bed while all non-magnetics at this size are collected as final product from the process. The smaller particles are returned to the chlorination step to complete the chlorination of their titanium dioxide values to titanium tetrachloride.

EXAMPLE II

The process has been simulated at laboratory scale and the material balance is shown in Tables 1 and 2. Table 2 is a continuation of Table 1 with A' of Table 1 continuing with A' of table 2 and B' of Table 1 continuing with B' of Table 2. 200 Gm. of the said South African ilmenite was contacted with CO, $TiCl_4$ vapor and $N_2$ at the rate of 26 mmol/min. for 20 minutes at 1000° C. The reactor used was a quartz tube of 2.0 inches diameter, and electrically heated. Direct use of TiCl₄ vapor was necessary for laboratory scale experiments, because the required bed depth for making large amounts of TiCl₄ in the reactor bed was absent in a small bed. This step is referred to as Chlorination I in Table 1. The bed was crushed and divided into two fractions. The first fraction being particles which were retained by an 85 mesh (B.S.) screen, and the second fraction being particles which passed through an 85 mesh (B.S.) screen. The first fraction was then magnetically separated. The magnetic fraction was again crushed and the fines (−200 mesh) discarded. The −85 +200 fraction was again magnetically separated. The magnetic portion was retained for subsequent chlorination. The second fraction, namely the −85 mesh fraction from the reactor bed, was magnetically separated. The non-magnetic fraction had an analysis of 90% TiO₂, and 2% Fe₂O₃. The magnetic fraction together with the said magnetic fraction from the said −85 +200 particles were further chlorinated with TiCl₄, CO and N₂ at 26 mmols/min for 4 minutes, and subsequently contacted for 1 minute with CO, and for 1 minute with Cl₂, alternatively, at 26 mmols/min for 10 minutes. This step is referred to as Chlorination II in Table 2. The reactor bed was then reduced, cooled, and magnetically separated. The non-magnetic fraction which represented the final product has an analysis of 95% TiO₂ and 0.1%, Fe₂O₃, by weight.

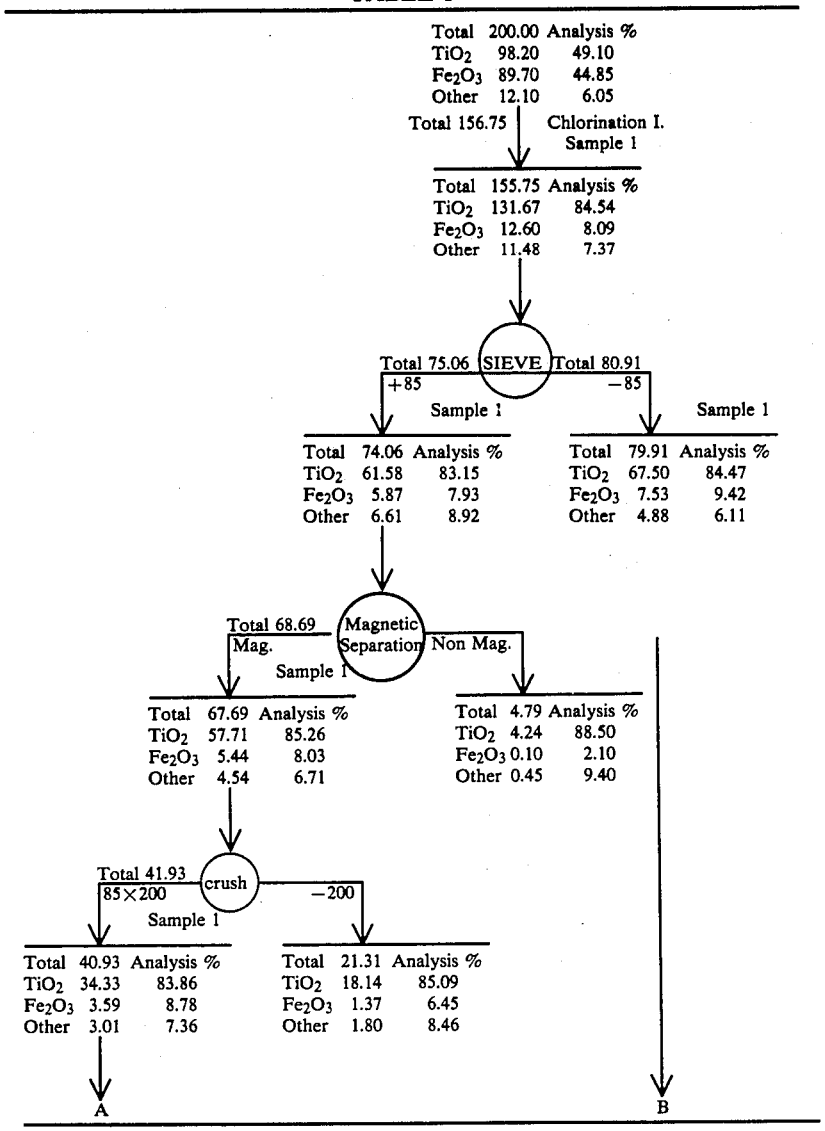

TABLE 1

TABLE 2

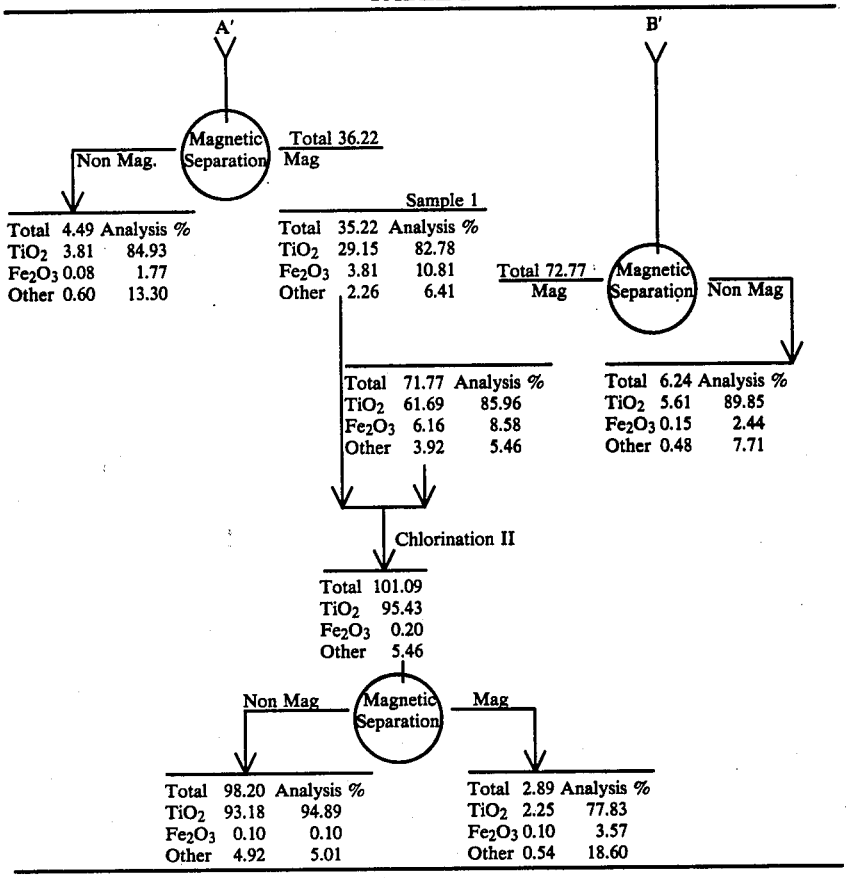

The foregoing description has been given only for clarity of understanding and no unncessary limitations are to be understood therefrom. The invention is not limited to the exact details for obvious modifications will occur to those skilled in the art.

The embodiments of the invention in which an exclusive property or privilege is claimed are defined as follows:

1. A process for beneficiating titaniferous ores into a substantially pure titanium dioxide product comprising:
   (a) continuously subjecting, in a gas-solids reactor with chlorine under fluidizing conditions and at a temperature of 900°–1100° C., a reactor bed mixture of 10–30%, by weight, of carbon and a particulate titaniferous ore wherein said particulate titaniferous ore is a mixture comprising (i) a larger particle size fraction having up to 90%, by weight, of titaniferous ore particles having a gangue content of up to 5%, by weight, and having particle size of −60 to +120 mesh and (ii) a smaller particle size fraction having up to 90%, by weight, of titaniferous ore particles having a gangue content of at least 7%, by weight, and a particle size of −120 to +200 mesh, wherein the amount of titanium values in said smaller sized fraction is equal to or less than the amount of titanium required to replace the iron values in said larger size fraction;
   (b) continuously withdrawing a portion of the reactor bed and separating said withdrawn portion into the substantially pure titanium dioxide product containing 3 to 4%, by weight, of gangue and a partially beneficiated titaniferous ore product, recycling to the reactor said partially beneficiated titaniferous ore product mixed with sufficient fresh reactor bed mixture to maintain a constant reactor bed depth whereby the smaller particle size fraction is converted within the reactor bed to form vaporized iron chloride and titanium tetrachloride and freeing gangue associated with said smaller particle size fraction and said titanium tetrachloride reacts with the larger particle size ore thereby replacing iron values in said larger particle size titaniferous ore with titanium values and forming thereby vaporized iron chloride; and
   (c) withdrawing freed gangue and vaporized iron chloride.

* * * * *